United States Patent
Gupta et al.

(10) Patent No.: US 9,990,453 B2
(45) Date of Patent: Jun. 5, 2018

(54) CLOCK-DOMAIN-CROSSING SPECIFIC DESIGN MUTATIONS TO MODEL SILICON BEHAVIOR AND MEASURE VERIFICATION ROBUSTNESS

(71) Applicant: Synopsys, Inc., Mountain View, CA (US)

(72) Inventors: Namit K. Gupta, San Jose, CA (US); Jean-Marc A. Forey, Grenoble (FR); Mahantesh D. Narwade, Mountain View, CA (US); Horia A. Toma, Sunnyvale, CA (US)

(73) Assignee: SYNOPSYS, INC., Mountain View, CA (US)

( * ) Notice: Subject to any disclaimer, the term of this patent is extended or adjusted under 35 U.S.C. 154(b) by 50 days.

(21) Appl. No.: 14/673,338

(22) Filed: Mar. 30, 2015

(65) Prior Publication Data
US 2016/0292331 A1 Oct. 6, 2016

(51) Int. Cl.
*G06F 17/50* (2006.01)
*G01R 31/317* (2006.01)

(52) U.S. Cl.
CPC ....... *G06F 17/5031* (2013.01); *G01R 31/317* (2013.01); *G06F 17/5081* (2013.01); *G06F 2217/14* (2013.01); *G06F 2217/84* (2013.01)

(58) Field of Classification Search
CPC .................. G06F 17/5031; G06F 17/5081
USPC .................. 716/106, 107, 111, 136
See application file for complete search history.

(56) References Cited

U.S. PATENT DOCUMENTS

| | | | |
|---|---|---|---|
| 6,353,906 B1 * | 3/2002 | Smith | G01R 31/31922 714/731 |
| 8,707,229 B1 * | 4/2014 | Dobkin | G06F 17/5031 716/106 |
| 9,817,433 B2 * | 11/2017 | Talupuru | G06F 1/08 |
| 2007/0130492 A1 * | 6/2007 | Jamkhandi | G01R 31/318594 714/744 |
| 2007/0288874 A1 * | 12/2007 | Czeck | G06F 17/5031 716/102 |
| 2009/0153194 A1 * | 6/2009 | Cumming | H03K 5/15066 326/93 |
| 2010/0199244 A1 * | 8/2010 | Kwok | G06F 17/504 716/113 |
| 2011/0116337 A1 * | 5/2011 | Hay | G06F 5/10 365/233.11 |
| 2012/0180015 A1 * | 7/2012 | Mneimneh | G06F 17/5045 716/113 |
| 2013/0239080 A1 * | 9/2013 | Sarwary | G06F 17/5022 716/113 |
| 2014/0376569 A1 * | 12/2014 | Philip | G06F 1/04 370/503 |

* cited by examiner

*Primary Examiner* — Phallaka Kik
(74) *Attorney, Agent, or Firm* — Park, Vaughan, Fleming & Dowler LLP; Laxman Sahasrabuddhe

(57) ABSTRACT

Methods and apparatuses related to clock-domain-crossing (CDC) specific design mutations to model silicon behavior and measure verification robustness are described. CDC signal paths can be identified in a circuit design. Next, synchronization circuitry associated with the CDC signal paths can be identified. Design mutations can be added to the identified synchronization circuitry. The design mutations can then be used during functional verification to measure verification robustness of a circuit verification test suite.

18 Claims, 8 Drawing Sheets

---

Receive a circuit design comprising synchronization circuitry associated with at least one clock-domain-crossing (CDC) signal
202

Add a design mutation to the synchronization circuitry, wherein activating the design mutation modifies a behavior of the synchronization circuitry, and wherein the design mutation helps determine whether or not a verification test covers the synchronization circuitry
204

CLOCK-DOMAIN-CROSSING SPECIFIC DESIGN MUTATIONS TO MODEL SILICON BEHAVIOR AND MEASURE VERIFICATION ROBUSTNESS

BACKGROUND

Technical Field

This disclosure relates to electronic design automation (EDA). More specifically, this disclosure relates to clock-domain-crossing (CDC) specific design mutations to model silicon behavior and measure verification robustness.

Related Art

The importance of circuit verification cannot be overemphasized. Indeed, without circuit verification it would be impossible to create correct circuit designs for the large and complex integrated circuits (ICs) that are commonly found in electronic devices. Today's complex circuit designs often include multiple clock domains. Signals that cross clock boundaries can cause data integrity problems if the signals are not synchronized properly.

There have been many cases in which a bug in a circuit implementation had a significant impact on the company's finances. For example, in one well-publicized instance, a bug in a floating-point division circuit cost the company hundreds of millions of dollars. Therefore, it is very important to verify the circuit design, and in particular circuitry that handles CDC signals.

SUMMARY

Some embodiments described herein provide methods and systems for adding design mutations to synchronization circuitry in a circuit design and to use the design mutations to measure verification robustness. The design mutations can model silicon behavior or model incorrect behavior. Specifically, some embodiments can receive a circuit design that includes synchronization circuitry associated with at least one CDC signal. Next, the embodiments can add a design mutation to the synchronization circuitry, wherein activating the design mutation modifies a behavior of the synchronization circuitry, and wherein the design mutation helps determine whether or not a verification test covers the synchronization circuitry.

Specifically, during an execution of the verification test on the circuit design, the embodiments can check if (1) the design mutation was activated, and (2) the CDC signal toggled while the design mutation was active. Next, the embodiments can determine whether or not the verification test covers the synchronization circuitry based on results of said checking. In particular, the verification test can be said to cover the synchronization circuitry if the design mutation was activated and the CDC signal toggled while the design mutation was active, and the verification test can be said not to cover the synchronization circuitry if the design mutation was not activated or the CDC signal did not toggle while the design mutation was active.

In some embodiments, the synchronization circuitry can be configured to pass the CDC signal through a chain of sequential circuit elements, and the design mutation, when activated, can modify a behavior of the synchronization circuitry. For example, a first design mutation, when activated, can pass the CDC signal through the chain of sequential circuit elements and additionally through at least one additional sequential circuit element. A second design mutation, when activated, can cause the CDC signal to bypass the chain of sequential circuit elements. A third design mutation, when activated, can insert a glitch into the CDC signal. A fourth design mutation, when activated, can insert an additional pulse into the CDC signal.

In some embodiments, the synchronization circuitry can comprise a data path, a control path, and gating circuitry, wherein the gating circuitry receives data from the data path and blocks or passes the data based on a control input received from the control path. In these embodiments, the design mutation, when activated, can cause the data on the data path to bypass the gating circuitry.

In some embodiments, the synchronization circuitry can comprise a request path and an acknowledgment path, wherein a sender sends a request to the receiver via the request path and the receiver provides an acknowledgment to the sender via the acknowledgment path based on whether or not the receiver is ready to receive data from the sender. In these embodiments, the design mutation, when activated, can provide a constant acknowledgment signal to the sender via the acknowledgment path regardless of whether or not the receiver is ready to receive the data from the sender.

In some embodiments, the circuit design can comprise a write controller to maintain a write pointer where next input data is to be written into a memory, and a read controller to (1) maintain a read pointer where next stored data is to be read from the memory, and (2) output a memory empty signal that indicates whether or not the memory is empty. The synchronization circuitry can either pass or block data that was read from the memory based on the memory empty signal. In these embodiments, the design mutation, when activated, sets the memory empty signal to a constant value regardless of whether or not the memory is empty.

In some embodiments, the synchronization circuitry can comprise a chain of sequential circuit elements, wherein a reset input of each sequential circuit element in the chain of sequential circuit elements receives an asynchronous reset signal, and wherein a reset input of an additional sequential circuit element receives an output signal from a last sequential circuit element in the chain of sequential circuit elements. In these embodiments, the design mutation, when activated, can directly provide the asynchronous reset signal to the reset input of the additional sequential circuit element.

Some embodiments can receive a circuit design that includes synchronization circuitry associated with at least one CDC signal, wherein the synchronization circuitry includes at least one design mutation that modifies a behavior of the synchronization circuitry, and wherein the design mutation helps determine whether or not a verification test covers the synchronization circuitry. Next, during an execution of the verification test on the circuit design, the embodiments can check if (1) the design mutation was activated, and (2) the CDC signal toggled while the design mutation was active. The embodiments can then determine whether or not the verification test covers the synchronization circuitry based on results of said checking.

The embodiments can also report an error based on the results of the verification tests. Specifically, if the design mutation models a silicon behavior of the synchronization circuitry, the embodiments can report an error if (1) the verification test fails when the design mutation is not active, or (2) the verification test passes when the design mutation is not active, but fails when the design mutation is active. On the other hand, if the design mutation models an incorrect behavior of the synchronization circuitry, then the embodiments can report an error if (1) the verification test fails when the design mutation is not active, or (2) the verification test passes when the design mutation is not active, but also passes when the design mutation is active.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview of an EDA Flow

An EDA flow can be used to create a circuit design. Once the circuit design is finalized, it can undergo fabrication, packaging, and assembly to produce integrated circuit chips. An EDA flow can include multiple steps, and each step can involve using one or more EDA software tools. Some EDA steps and software tools are described below. These examples of EDA steps and software tools are for illustrative purposes only and are not intended to limit the embodiments to the forms disclosed.

Some EDA software tools enable circuit designers to describe the functionality that the circuit designers want to implement. These tools also enable circuit designers to perform what-if planning to refine functionality, check costs, etc. During logic design and functional verification, the HDL (hardware description language), e.g., SystemVerilog, code can be written and the design can be checked for functional accuracy, e.g., the design can be checked to ensure that it produces the correct outputs.

During synthesis and design for test, the HDL code can be translated to a netlist using one or more EDA software tools. Further, the netlist can be optimized for the target technology, and tests can be designed and implemented to check the finished chips. During netlist verification, the netlist can be checked for compliance with timing constraints and for correspondence with the HDL code.

During design planning, an overall floorplan for the chip can be constructed and analyzed for timing and top-level routing. During physical implementation, circuit elements can be positioned in the layout and can be electrically coupled.

During analysis and extraction, the circuit's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped-out" to produce masks, which are used during fabrication of IC chips.

CDC Specific Design Mutation

Figure 1A:
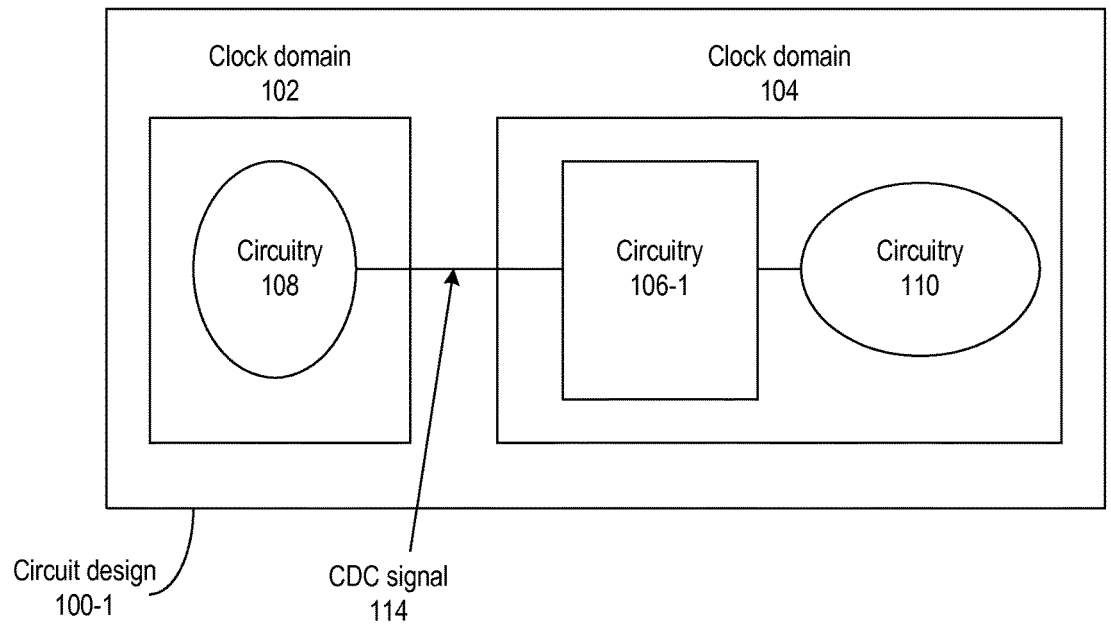
FIGS. 1A-1B illustrate a CDC specific design mutation in accordance with some embodiments described herein.
Figure 1B:
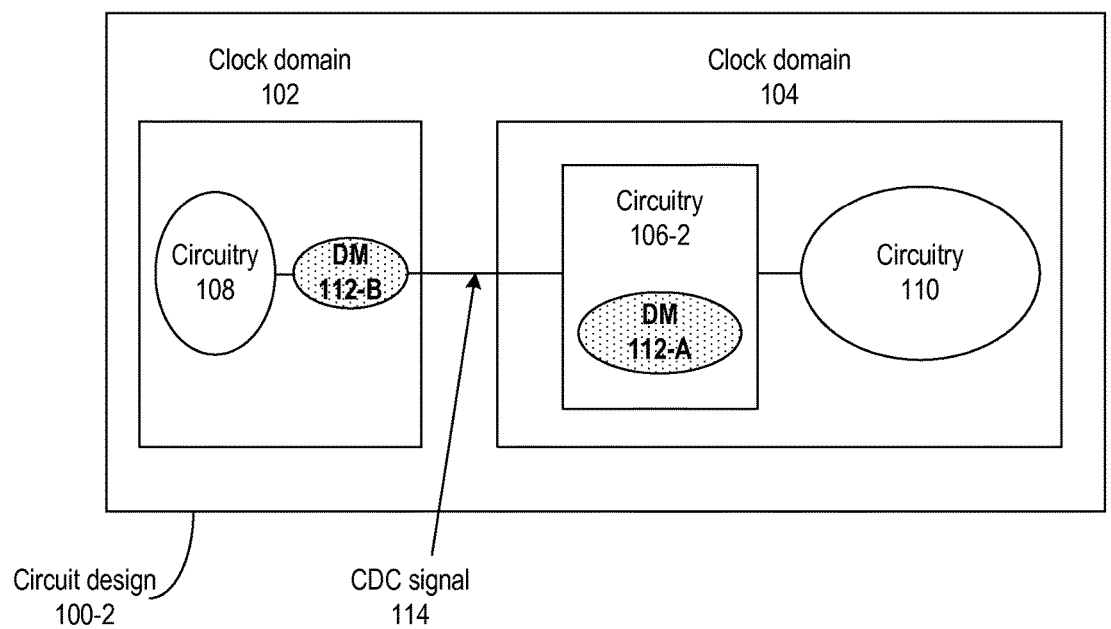

FIGS. 1A-1B illustrate a CDC specific design mutation in accordance with some embodiments described herein. Circuit design 100-1 can include clock domains 102 and 104. The circuitry within each clock domain can operate based on a corresponding clock signal. For example, circuitry 108 can operate based on a first clock signal (e.g., clock C1) and circuitry 110 can operate based on a second clock signal (e.g., clock C2). According to one definition, a CDC signal can be (1) a signal that crosses from one clock domain to another clock domain, or (2) an asynchronous signal. For example, CDC signal 114 is a CDC signal because it crosses from clock domain 102 to clock domain 104.

The frequency and/or the phase of the clocks corresponding to different clock domains may not match. Therefore, circuit designs require synchronization circuitry to ensure integrity of the information that is carried by CDC signals. The term "synchronization circuitry" generally refers to any circuitry in the circuit design that prevents corruption of the information carried by the CDC signal when the CDC signal crosses clock domains. For example, the synchronization circuitry associated with CDC signal 114 may include circuitry 106-1 in clock domain 104, and may also include circuitry in clock domain 102 (not shown in FIG. 1A).

During functional verification, the circuit design can be checked for functional accuracy, e.g., the design can be checked to ensure that it produces the correct outputs for a given set of inputs. Obviously, synchronization circuitry (e.g., circuitry 106-1) must operate correctly if circuit design 100-1 is to operate correctly. Therefore, it is very important to check that the synchronization circuitry (e.g., circuitry 106-1) is covered by verification tests that are used during functional verification. Some embodiments described herein add one or more design mutations 112-A and/or 112-B (shown in FIG. 1B as shaded ovals) to the synchronization circuitry. Circuitry 106-2 is essentially circuitry 106-1 with one or more design mutations that are capable of being activated based on an activation signal. Circuit design 100-2 can be used to help determine whether or not a verification test covers the synchronization circuitry (e.g., circuitry 106-1 in circuitry design 100-1).

Specifically, a design mutation (e.g., design mutation 112-A and/or 112-B), when activated, modifies a behavior of the synchronization circuitry. For example, the design mutation, when activated, can either (1) simulate a silicon behavior of the synchronization circuitry (explained below), or (2) simulate incorrect behavior of the synchronization circuitry (thereby effectively creating a "bug" in the circuit design). Functional verification is typically performed on the HDL code of the circuit design. The HDL representation of the circuit design is an idealized representation of the circuit design, i.e., the actual behavior of the IC chip (which is referred to as the "silicon behavior" in this disclosure) can be different from the behavior modeled by the HDL description of the circuit design. For example, an actual semiconductor implementation of a sequential circuit element (e.g., a flip-flop) can exhibit metastability if the sequential circuit element's setup or hold times are violated. However, metastabitily is not modeled by an HDL description of the sequential circuit element. In some embodiments, the design mutation, when activated, models a behavior that a silicon implementation of the HDL design is expected to exhibit. (More details on how silicon behavior can be modeled by a design mutation are provided below in reference to FIGS. 3A-3B.)

Once design mutations are added to the circuit design, a set of verification tests can be executed on the circuit design. During verification, the verification platform can activate the design mutations either one at a time or in groups. For a design mutation that models incorrect behavior, at least one verification test is expected to fail. If no verification tests fail, then the verification test suite may not sufficiently cover CDC synchronization circuitry.

For a design mutation that models silicon behavior, none of the verification tests should fail because the silicon behavior is expected to occur during normal and correct operation of the IC chip. Therefore, if a verification test fails when the design mutation is activated, then it may mean that the verification test has a bug (e.g., the verification test may include an assertion that is violated by normal and correct behavior of the IC chip) or that the circuit design has a bug (e.g., the circuit design incorrectly assumes that the silicon behavior will match the idealized HDL behavior).

Figure 2A:
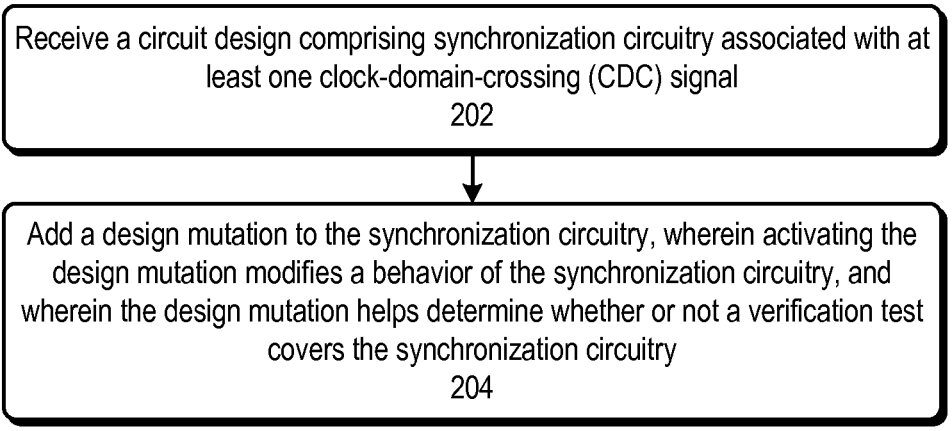
FIG. 2A illustrates a process for adding a design mutation to a circuit design in accordance with some embodiments described herein.

FIG. 2A illustrates a process for adding a design mutation to a circuit design in accordance with some embodiments described herein. The process can begin by receiving a circuit design (e.g., HDL code for the circuit design) that includes synchronization circuitry associated with at least one CDC signal (operation 202). Next, the process can add a design mutation to the synchronization circuitry, wherein activating the design mutation modifies a behavior of the synchronization circuitry, and wherein the design mutation helps determine whether or not a verification test covers the synchronization circuitry (operation 204). The modified circuit design can then be stored in a non-transitory computer-readable storage medium for later use by a circuit verification tool.

Specifically, the process can identify a CDC path that is launched in one clock domain and captured in another clock domain (e.g., the process can identify a circuit path that connects an output of a first sequential circuit element that operates based on a first clock with an input of a second sequential circuit element that operates based on a second clock). Next, the process can identify synchronization circuitry associated with the CDC path, and add one or more design mutations to the identified synchronization circuitry.

Figure 2B:
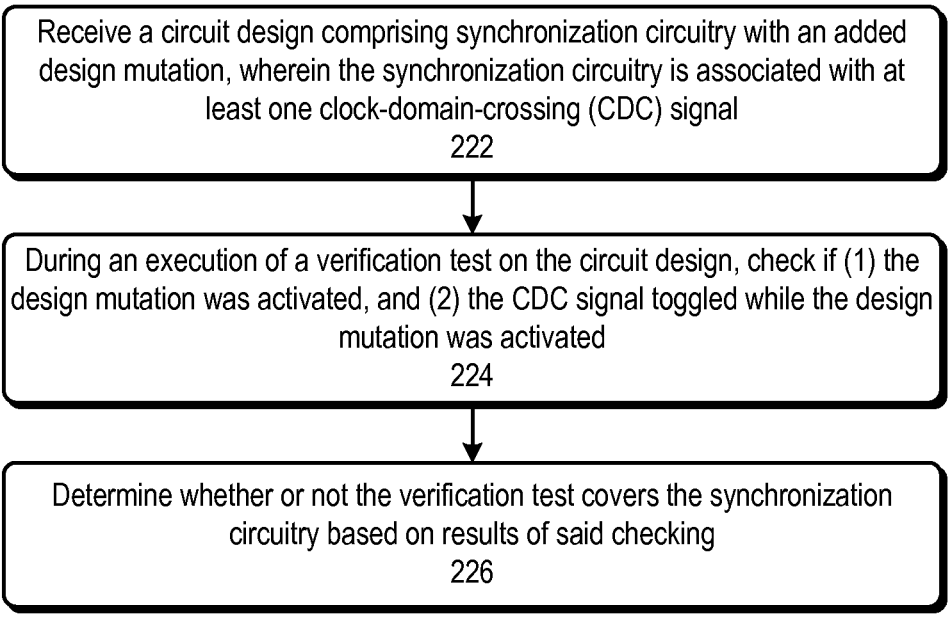
FIG. 2B illustrates a process for determining coverage of CDC synchronization circuitry in accordance with some embodiments described herein.

FIG. 2B illustrates a process for determining coverage of CDC synchronization circuitry in accordance with some embodiments described herein. The process can begin by receiving a circuit design comprising synchronization circuitry with an added design mutation, wherein the synchronization circuitry is associated with at least one CDC signal (operation 222). Next, during an execution of a verification test on the circuit design, the process can check if (1) the design mutation was activated, and (2) the CDC signal toggled while the design mutation was activated (operation 224). The process can then determine whether or not the verification test covers the synchronization circuitry based on results of said checking (operation 226). Specifically, the process can determine that the verification test covers the synchronization circuitry if the design mutation was activated and the CDC signal toggled while the design mutation was active. Conversely, the process can determine that the verification test does not cover the synchronization circuitry if the design mutation was not activated or the CDC signal did not toggle while the design mutation was active.

The process can also report an error based on the results of the verification tests. Specifically, if the design mutation models a silicon behavior of the synchronization circuitry, the process can report an error if (1) the verification test fails when the design mutation is not active, or (2) the verification test passes when the design mutation is not active, but fails when the design mutation is active. On the other hand, if the design mutation models an incorrect behavior of the synchronization circuitry, then the process can report an error if (1) the verification test fails when the design mutation is not active, or (2) the verification test passes when the design mutation is not active, but also passes when the design mutation is active.

Examples of CDC Specific Design Mutations

This section presents examples of CDC specific design mutations only for purposes of illustration and description. These examples are not intended to be exhaustive or to limit the present invention to the forms disclosed. Accordingly, many modifications and variations will be apparent to practitioners skilled in the art.

Figure 3A:
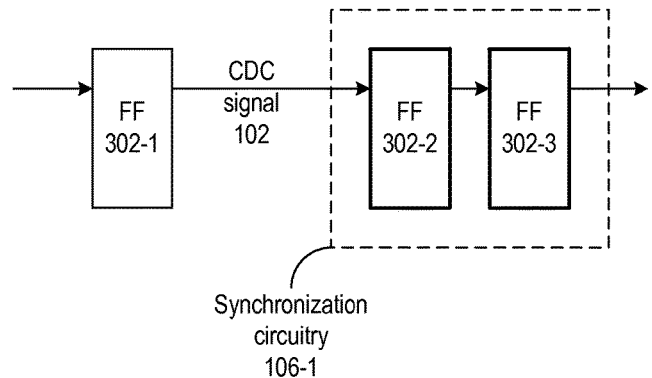
FIGS. 3A-3B illustrate examples of CDC specific design mutations in accordance with some embodiments described herein.
Figure 3B:
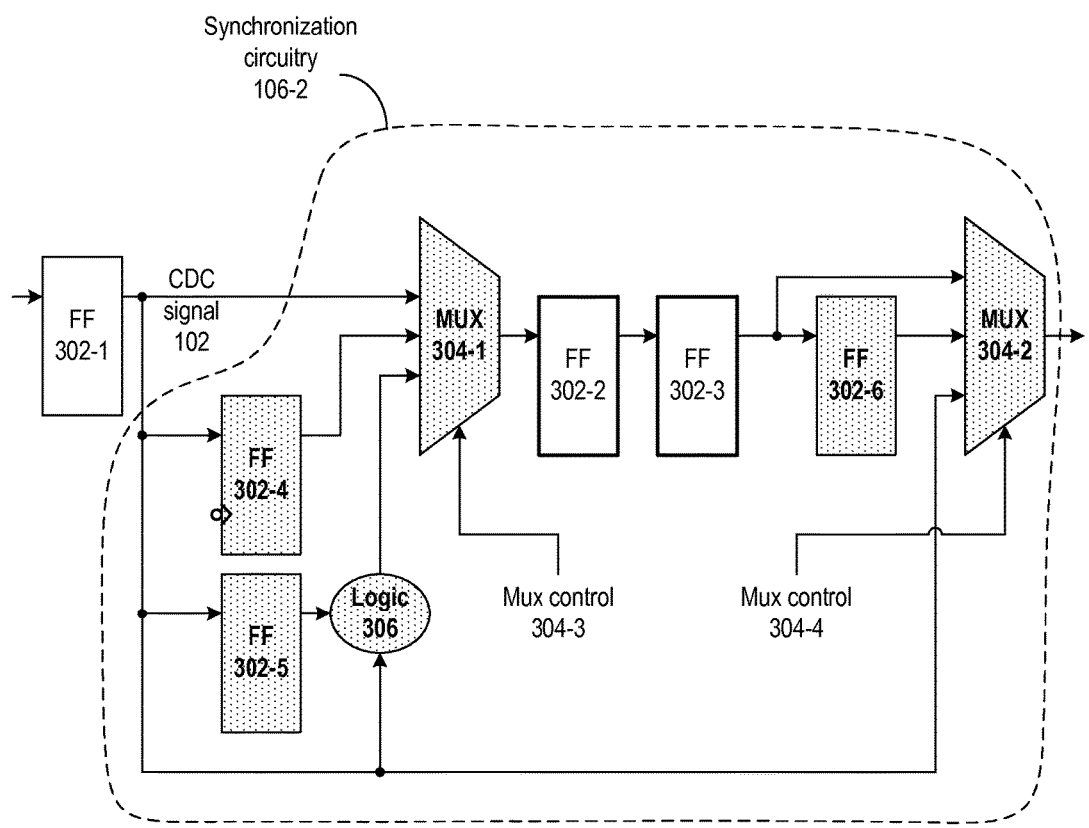

FIGS. 3A-3B illustrate examples of CDC specific design mutations in accordance with some embodiments described herein. The shaded circuit elements in FIG. 3B correspond to one or more design mutations. Flip-flop 302-1 can operate based on a first clock signal and flip-flops 302-2 and 302-3 can operate based on a second clock signal. In FIG. 3A, a chain of sequential circuit elements (e.g., flip-flops 302-2 and 302-3) can correspond to the synchronization circuitry 106-1 in FIG. 1A. Note that the boundary of flip-flop 302-1 has been made thinner than the boundary of flip-flops 302-2 and 302-3 to represent the fact that flip-flop 302-1 is in a different clock domain than flip-flops 302-2 and 302-3. CDC signal 114 originates at an output of flip-flop 302-1 (the launch flip-flop) and terminates at an input of flip-flop 302-2 (the capture flip-flop). In between the launch and capture flip-flops, CDC signal 114 may pass through combinational logic (i.e., circuitry that includes AND, OR, etc. gates that are not clocked based on a clock signal).

FIG. 3B illustrates multiple design mutations. Specifically, a first design mutation corresponds to flip-flop 302-6, which can be used to pass the CDC signal through at least one additional sequential circuit element (e.g., flip-flop 302-6) in addition to the chain of sequential circuit elements (e.g., flip-flops 302-2 and 302-3) that correspond to the synchronization circuitry. A second design mutation corresponds to multiplexer 304-2, which can be used to bypass the chain of sequential circuit elements (e.g., flip-flops 302-2 and 302-3) that correspond to the synchronization circuitry. A third design mutation corresponds to flip-flop 302-5 and logic 306, which can be used to insert a glitch into the CDC signal. Finally, a fourth design mutation corresponds to flip-flop 302-4 that is triggered by negative clock edges (as opposed to the other flip-flops in FIG. 3B that are triggered by positive clock edges), wherein flip-flop 302-4 can be used to insert a short pulse into the CDC signal. Multiplexers 304-1 and 304-2, and multiplexer control signals 304-3 and 304-4 can be used to determine which of these four design mutations are activated. The circuitry within the dashed enclosure can correspond to the synchronization circuitry with design mutations 106-2 in FIG. 1A. Note that flip-flops 302-1, 302-4, and 302-5 are in one clock domain, and flop-flops 302-2, 302-3, and 302-6 are in another clock domain.

The second, third, and fourth design mutations model incorrect behaviors of the synchronization circuitry. The first design mutation, i.e., the design mutation that corresponds to flip-flop 302-6, models a silicon behavior of the synchronization circuitry. Specifically, depending on the phase difference between the two clock signals, the CDC signal 114 may be delayed by an additional clock cycle before being outputted by flip-flop 302-3. Note that the HDL code for synchronization circuitry in FIG. 3A does not model this silicon behavior because the HDL code for the synchronization circuitry does not model setup or hold times of sequential circuit elements, nor does it model phase differences between clock signals. However, flip-flop 302-6 can be used to insert an additional clock cycle delay in CDC signal 114, thereby modeling the silicon behavior.

A verification platform can provide the appropriate multiplexer control signals 304-3 and 304-4 to multiplexers 304-1 and 304-2, respectively, to activate a specific type of design mutation and execute verification tests on the circuit design. For the second, third, and fourth mutations, at least one of the verification tests is expected to fail. For the first mutation, none of the verification tests are expected to fail because the first mutation models a silicon behavior of the synchronization circuitry, which can occur during normal and correct operation of the circuit design.

Figure 4A:
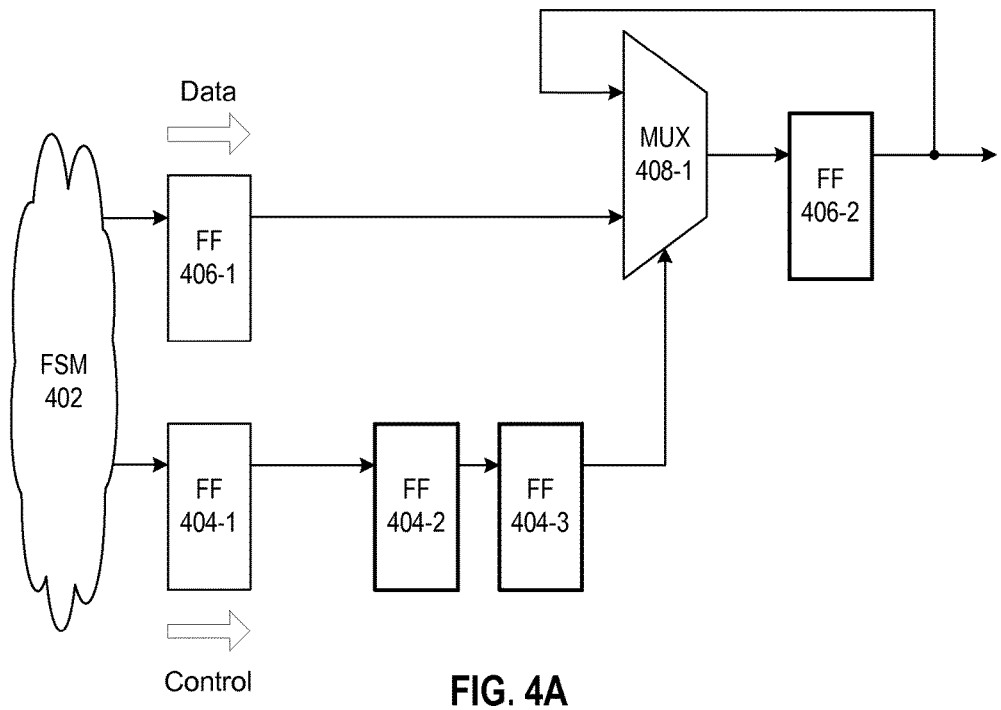
FIGS. 4A-4B illustrate an example of a CDC specific design mutation in accordance with some embodiments described herein.
Figure 4B:
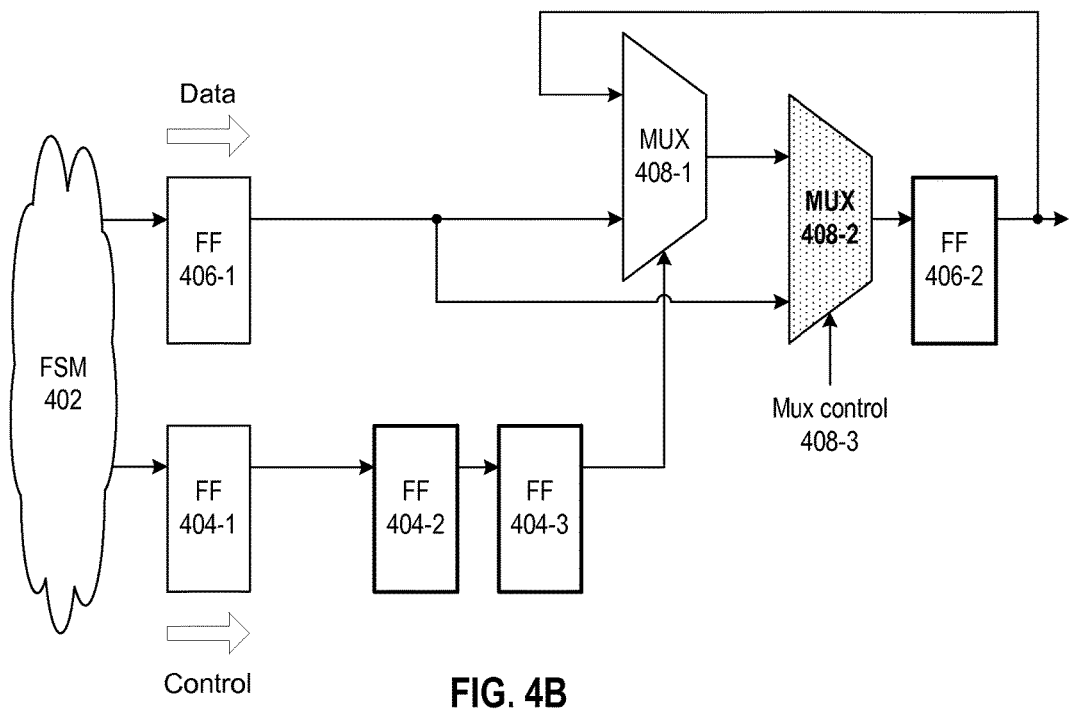

FIGS. 4A-4B illustrate an example of a CDC specific design mutation in accordance with some embodiments described herein. The shaded circuit element in FIG. 4B corresponds to the design mutation. Finite state machine (FSM) 402 can generally represent circuitry that generates data based on a first clock signal. In FIGS. 4A-4B, the data generated by FSM 402 needs to be provided to another circuitry in a different clock domain that operates based on a second clock signal. Flip-flops 404-1, 404-2, 404-3, 406-1, and 406-2, and multiplexer 408-1 are part of the synchronization circuitry that ensures the integrity of data generated by FSM 402 when it is provided to circuitry that operates based on the second clock signal. Specifically, the synchronization circuitry comprises a data path (e.g., flip-flops 406-1 and 406-2), a control path (e.g., flip-flops 404-1, 404-2, and 404-3), and gating circuitry (e.g., multiplexer 408-1), wherein the gating circuitry receives data from the data path and either blocks or passes the data based on a control input received from the control path. When the data is ready, FSM 402 sends a control signal to multiplexer 408-1 via the control path comprising flip-flops 404-1, 404-2, and 404-3. The control signal causes multiplexer 408-1 to couple the output of flip-flop 406-1 with the input of flip-flop 406-2, thereby providing the data generated by FSM 402 to the circuitry that operates based on the second clock signal.

FIG. 4B illustrates a design mutation (e.g., multiplexer 408-2) that, when activated (e.g., activated by using multiplexer control signal 408-3), causes data on the data path to bypass the gating circuitry. Specifically, multiplexer control signal 408-3 can cause multiplexer 408-2 to provide the output of flip-flop 406-1 to flip-flop 406-2, thereby bypassing the gating circuitry, i.e., multiplexer 408-1. The design mutation illustrated in FIG. 4B models an incorrect behavior of the synchronization circuitry, and should cause at least one of the verification tests to fail.

Figure 5A:
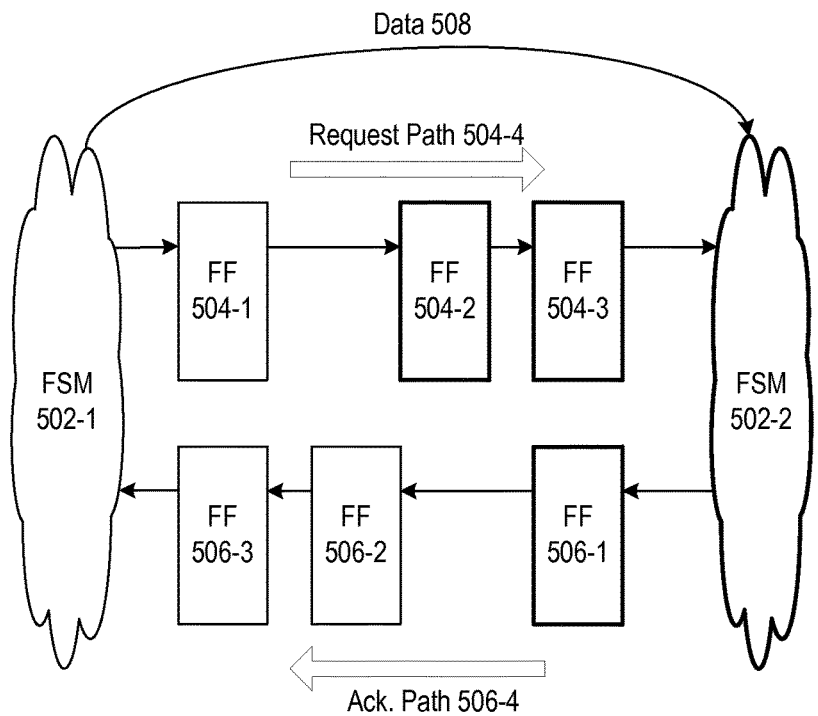
FIGS. 5A-5B illustrate a design mutation in accordance with some embodiments described herein.
Figure 5B:
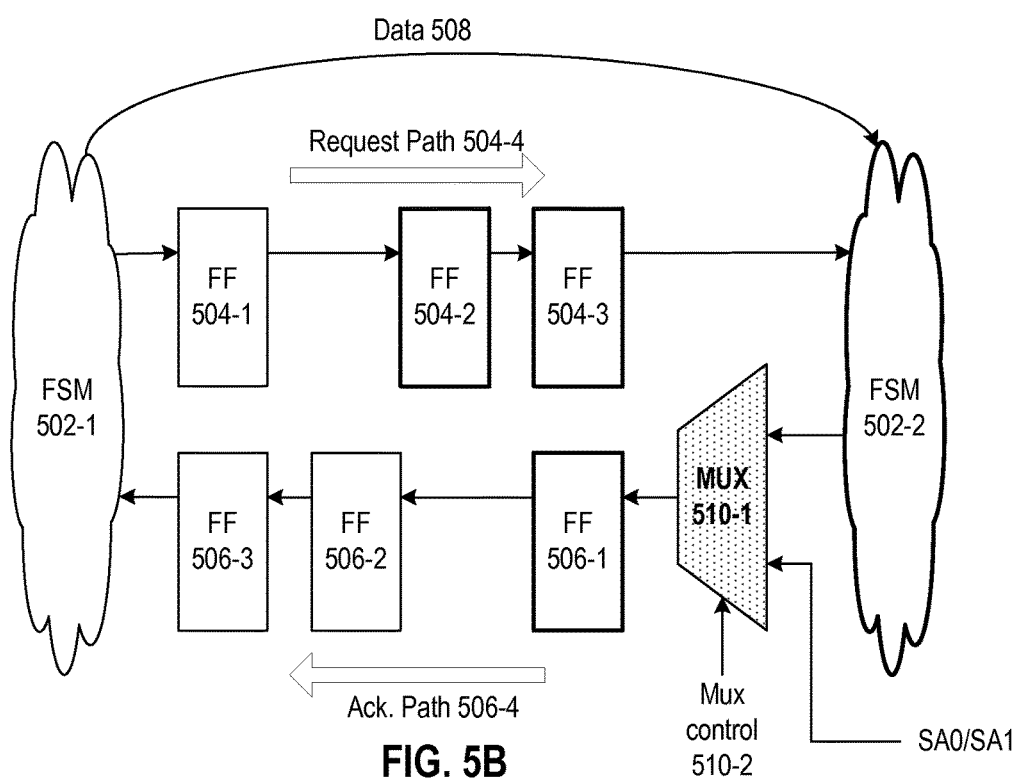

FIGS. 5A-5B illustrate a design mutation in accordance with some embodiments described herein. The shaded circuit element in FIG. 5B corresponds to the design mutation. FSM 502-1, which is in a first clock domain corresponding to a first clock signal, generates data 508 and sends data 508 to FSM 502-2, which is in a second clock domain corresponding to a second clock signal. Data integrity is guaranteed by the synchronization circuitry, which comprises request path 504-4 (e.g., flip-flops 504-1, 504-2, and 504-3) and an acknowledgment path 506-4 (e.g., flip-flops 506-1, 506-2, and 506-3). The sender (e.g., FSM 502-1) sends a request to the receiver (e.g., FSM 502-2) via the request path (e.g., request path 504-4) and the receiver provides an acknowledgment to the sender via the acknowledgment path (e.g., acknowledgment path 506-4) based on whether or not the receiver is ready to receive data from the sender. Specifically, if the receiver returns a positive acknowledgment to the sender, then that means the receiver is ready to receive the data and the sender can proceed with sending data 508 to the receiver. On the other hand, if the receiver returns a negative acknowledgment to the sender, then that means the receiver is not ready to receive the data and the sender may decide to wait for some time before sending another request to the receiver.

FIG. 5B illustrates a design mutation (e.g., multiplexer 510-1) that, when activated (e.g., activated by using multiplexer control signal 510-2), provides a constant acknowledgment signal to the sender via the acknowledgment path regardless of whether or not the receiver is ready to receive the data from the sender. For example, multiplexer 510-1 can send the constant signal SA0 (i.e., "stuck at 0" which may correspond to a negative acknowledgment) or SA1 (i.e., "stuck at 1" which may correspond to a positive acknowledgment) based on multiplexer control signal 510-2. The design mutation illustrated in FIG. 5B models an incorrect behavior of the synchronization circuitry, and should cause at least one of the verification tests to fail.

Figure 6A:
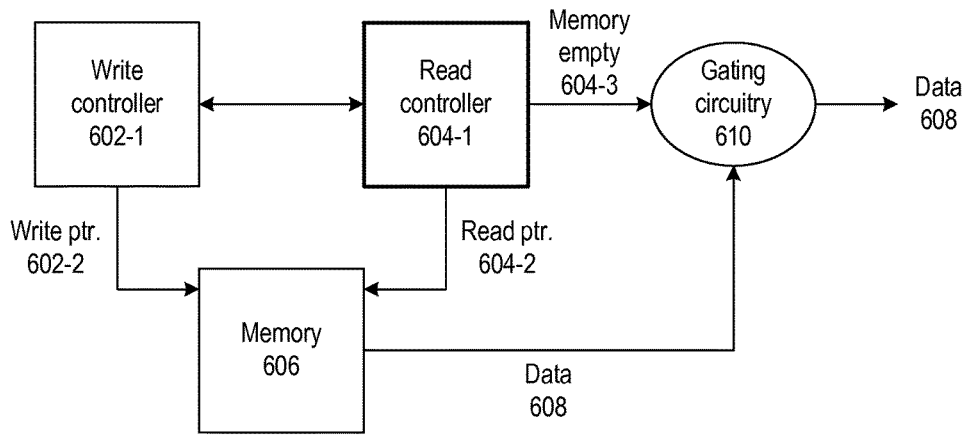
FIGS. 6A-6B illustrate a design mutation in accordance with some embodiments described herein.
Figure 6B:
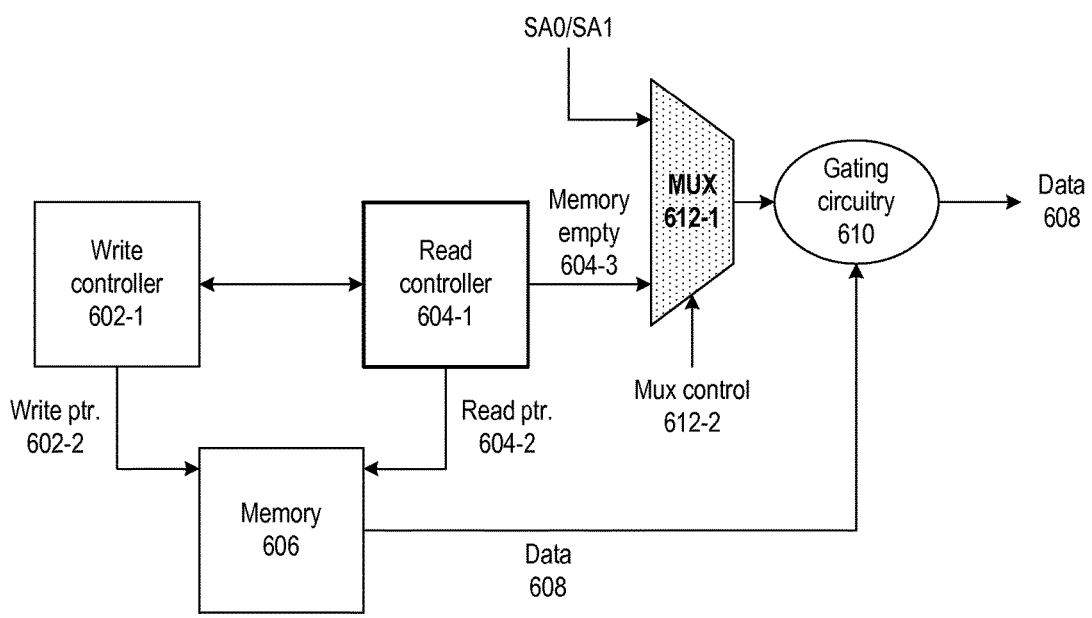

FIGS. 6A-6B illustrate a design mutation in accordance with some embodiments described herein. The shaded circuit element in FIG. 6B corresponds to the design mutation. The circuit design illustrated in FIG. 6A comprises write controller 602-1, read controller 604-1, memory 606, and gating circuitry 610. Write controller 602-1 maintains write pointer 602-2 where next input data is to be written into memory 606, and read controller 604-1 maintains read pointer 604-2 where next stored data is to be read from memory 606, and outputs memory empty signal 604-3 that indicates whether or not the memory is empty. The synchronization circuitry (e.g., gating circuitry 610) either passes or blocks data 608 that was read from memory 606 based on memory empty signal 604-3. Specifically, if memory empty signal 604-3 indicates that the memory is empty, then data 608 is not valid, and gating circuitry 610 will block data 608. On the other hand, if memory empty signal 604-3 indicates that the memory is not empty, then data 608 is valid, and gating circuitry 610 will pass data 608.

FIG. 6B illustrates a design mutation (e.g., multiplexer 612-1) that, when activated (e.g., activated by using multiplexer control signal 612-2), sets the memory empty signal to a constant value regardless of whether or not the memory is empty. Specifically, multiplexer 612-1 can send a constant signal (e.g., SA0/SA1) based on multiplexer control signal 612-2. The value "SA0" may correspond to the memory not being empty and the value "SA1" may correspond to the memory being empty. The design mutation illustrated in FIG. 6B models an incorrect behavior of the synchronization circuitry, and should cause at least one of the verification tests to fail.

Figure 7A:
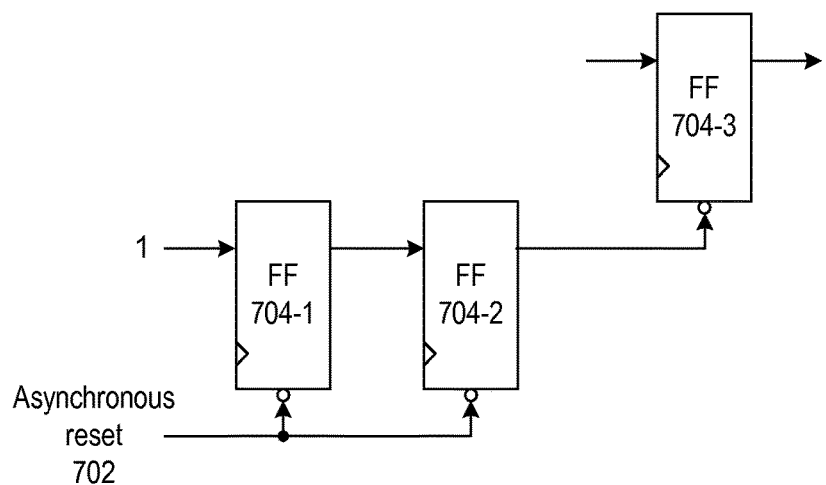
FIGS. 7A-7B illustrate a design mutation in accordance with some embodiments described herein.
Figure 7B:
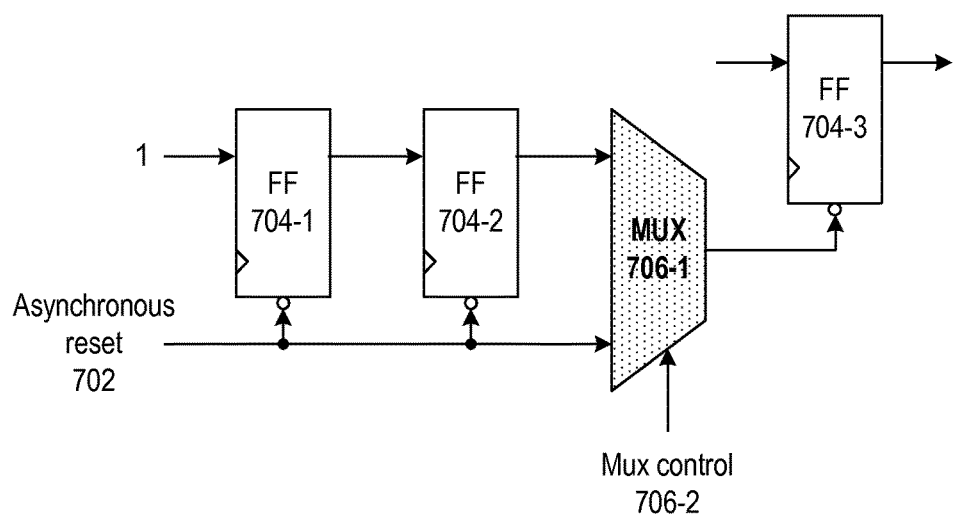

FIGS. 7A-7B illustrate a design mutation in accordance with some embodiments described herein. The shaded circuit element in FIG. 7B corresponds to the design mutation. Note that asynchronous reset signal 702 is the CDC signal in this example. The circuit design illustrated in FIG. 7A converts asynchronous reset signal 702 into a synchronous reset signal, and provides the synchronous reset signal to flip-flop 704-3. That is, the synchronous reset signal is provided to flip-flop 704-3 at a positive clock edge of the clock signal that is used for clocking flip-flops 704-1, 704-2, and 704-3. The synchronization circuitry comprises a chain of sequential circuit elements (e.g., flip-flops 704-1 and 704-2), wherein a reset input of each sequential circuit element in the chain of sequential circuit elements receives an asynchronous reset signal (e.g., asynchronous reset signal 702), and wherein a reset input of an additional sequential circuit element (e.g., flip-flop 704-3) receives an output signal from a last sequential circuit element (e.g., flip-flop 704-2) in the chain of sequential circuit elements.

FIG. 7B illustrates a design mutation (e.g., multiplexer 706-1) that, when activated (e.g., activated by using multiplexer control signal 706-2), directly provides the asynchronous reset signal (e.g., asynchronous reset signal 702) to the reset input of the additional sequential circuit element (e.g., flip-flop 704-3). In other words, the design mutation bypasses the synchronization circuitry and provides the asynchronous reset signal directly, i.e., asynchronously, to flip-flop 704-3. The design mutation illustrated in FIG. 7B models an incorrect behavior of the synchronization circuitry, and should cause at least one of the verification tests to fail.

Computer System

Figure 8:
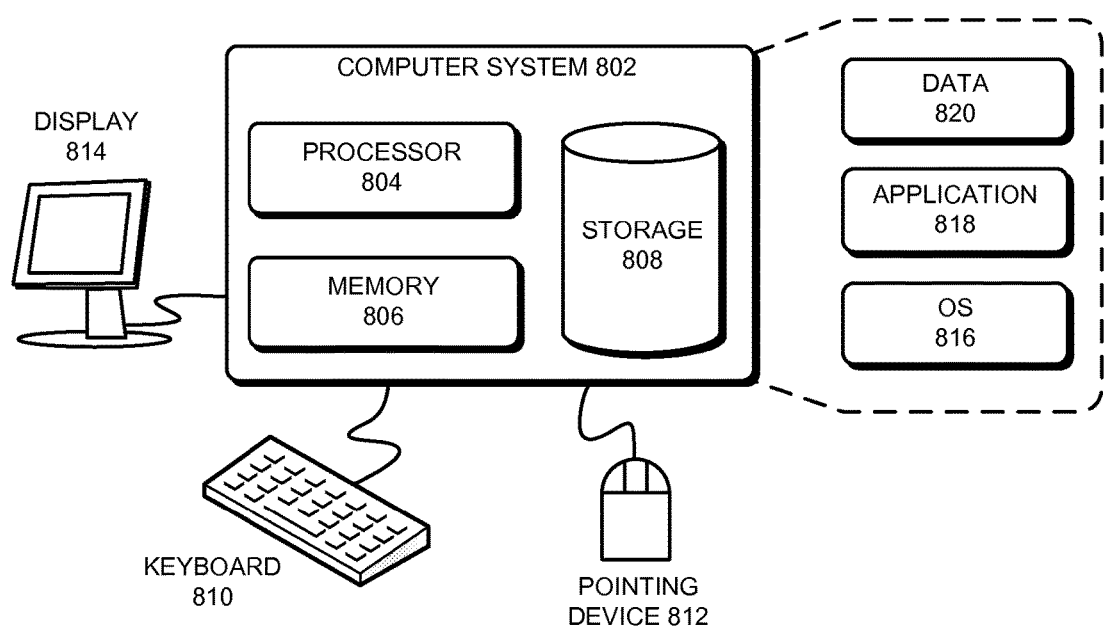
FIG. 8 illustrates a computer system in accordance with some embodiments described herein.

FIG. 8 illustrates a computer system in accordance with some embodiments described herein. Computer system 802 can include processor 804, memory 806, and storage device 808. Specifically, memory locations in memory 806 can be addressable by processor 804, thereby enabling processor 804 to access (e.g., via load and store instructions) and manipulate (e.g., via logical, floating point, arithmetic, etc. instructions) the data stored in memory 806. Computer system 802 can be coupled to display device 814, keyboard 810, and pointing device 812. Storage device 808 can store operating system 816, application 818, and data 820. Data 820 can include input required by application 818 and/or output generated by application 818.

Computer system 802 may automatically (or with user intervention) perform one or more operations that are implicitly or explicitly described in this disclosure. For example, computer system 802 can load application 818 into memory 806, and application 818 can then be used to (1) modify a circuit design by adding one or more design mutations to one or more synchronization circuitries in a circuit design, (2) execute verification tests on the modified circuit design, and (3) measure verification robustness by computing one or more coverage metrics based on pass/fail results of verification tests.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A non-transitory computer-readable storage medium storing instructions that, when executed by a computer, cause the computer to perform a method comprising:
   receiving a circuit design that includes synchronization circuitry associated with at least one clock-domain-crossing (CDC) signal;
   adding a design mutation to the synchronization circuitry, wherein activating the design mutation modifies a behavior of the synchronization circuitry, and wherein the design mutation helps determine whether or not a verification test covers the synchronization circuitry;
   determining that the verification test covers the synchronization circuitry;
   verifying the circuit design by using at least the verification test; and
   providing the circuit design to a next step in a circuit design and manufacturing process which, when completed, produces an integrated circuit chip that contains correct synchronization circuitry.

2. The non-transitory computer-readable storage medium of claim 1, wherein said determining that the verification test covers the synchronization circuitry comprises:
   during an execution of the verification test on the circuit design, checking if (1) the design mutation was activated, and (2) the CDC signal toggled while the design mutation was active; and
   determining that the verification test covers the synchronization circuitry based on results of said checking.

3. The non-transitory computer-readable storage medium of claim 2, wherein the verification test covers the synchronization circuitry if the design mutation was activated and the CDC signal toggled while the design mutation was active, and wherein the verification test does not cover the synchronization circuitry if the design mutation was not activated or the CDC signal did not toggle while the design mutation was active.

4. The non-transitory computer-readable storage medium of claim 1, wherein the synchronization circuitry is configured to pass the CDC signal through a chain of sequential circuit elements; and
wherein the design mutation, when activated, passes the CDC signal through the chain of sequential circuit elements and additionally through at least one additional sequential circuit element.

5. The non-transitory computer-readable storage medium of claim 1, wherein the synchronization circuitry is configured to pass the CDC signal through a chain of sequential circuit elements; and
wherein the design mutation, when activated, causes the CDC signal to bypass the chain of sequential circuit elements.

6. The non-transitory computer-readable storage medium of claim 1, wherein the synchronization circuitry is configured to pass the CDC signal through a chain of sequential circuit elements; and
wherein the design mutation, when activated, inserts a glitch into the CDC signal.

7. The non-transitory computer-readable storage medium of claim 1, wherein the synchronization circuitry is configured to pass the CDC signal through a chain of sequential circuit elements; and
wherein the design mutation, when activated, inserts an additional pulse into the CDC signal.

8. The non-transitory computer-readable storage medium of claim 1, wherein the synchronization circuitry comprises a data path, a control path, and gating circuitry, wherein the gating circuitry receives data from the data path and either blocks or passes the data based on a control input received from the control path; and
wherein the design mutation, when activated, causes the data on the data path to bypass the gating circuitry.

9. The non-transitory computer-readable storage medium of claim 1, wherein the synchronization circuitry comprises a request path and an acknowledgment path, wherein a sender sends a request to a receiver via the request path and the receiver provides an acknowledgment to the sender via the acknowledgment path based on whether or not the receiver is ready to receive data from the sender; and
wherein the design mutation, when activated, provides a constant acknowledgment signal to the sender via the acknowledgment path regardless of whether or not the receiver is ready to receive the data from the sender.

10. The non-transitory computer-readable storage medium of claim 1, wherein the circuit design comprises a write controller to maintain a write pointer where next input data is to be written into a memory, and a read controller to (1) maintain a read pointer where next stored data is to be read from the memory, and (2) output a memory empty signal that indicates whether or not the memory is empty;
wherein the synchronization circuitry either passes or blocks data that was read from the memory based on the memory empty signal; and
wherein the design mutation, when activated, sets the memory empty signal to a constant value regardless of whether or not the memory is empty.

11. The non-transitory computer-readable storage medium of claim 1, wherein the synchronization circuitry comprises a chain of sequential circuit elements, wherein a reset input of each sequential circuit element in the chain of sequential circuit elements receives an asynchronous reset signal, and wherein a reset input of an additional sequential circuit element receives an output signal from a last sequential circuit element in the chain of sequential circuit elements; and
wherein the design mutation, when activated, directly provides the asynchronous reset signal to the reset input of the additional sequential circuit element.

12. A method comprising:
an electronic design automation (EDA) tool in a computer receiving a circuit design that includes synchronization circuitry associated with at least one clock-domain-crossing (CDC) signal;
the EDA tool in the computer adding a design mutation to the synchronization circuitry, wherein activating the design mutation modifies a behavior of the synchronization circuitry, and wherein the design mutation helps determine whether or not a verification test covers the synchronization circuitry;
the EDA tool in the computer determining that the verification test covers the synchronization circuitry;
the EDA tool in the computer verifying the circuit design by using at least the verification test; and
the EDA tool in the computer providing the circuit design to a next step in a circuit design and manufacturing process which, when completed, produces an integrated circuit chip that contains correct synchronization circuitry.

13. The method of claim 12, wherein said determining that the verification test covers the synchronization circuitry comprises:
during an execution of the verification test on the circuit design, the EDA tool in the computer checking if (1) the design mutation was activated, and (2) the CDC signal toggled while the design mutation was active; and
the EDA tool in the computer determining that the verification test covers the synchronization circuitry based on results of said checking.

14. The method of claim 13, wherein the verification test covers the synchronization circuitry if the design mutation was activated and the CDC signal toggled while the design mutation was active, and wherein the verification test does not cover the synchronization circuitry if the design mutation was not activated or the CDC signal did not toggle while the design mutation was active.

15. A non-transitory computer-readable storage medium storing instructions for an electronic design automation (EDA) tool that, when executed by a computer, cause the computer to perform a method comprising:
receiving a circuit design that includes synchronization circuitry associated with at least one clock-domain-crossing (CDC) signal, wherein the synchronization circuitry includes at least one design mutation that modifies a behavior of the synchronization circuitry, and wherein the design mutation helps determine whether or not a verification test covers the synchronization circuitry;
during an execution of the verification test on the circuit design, checking if (1) the design mutation was activated, and (2) the CDC signal toggled while the design mutation was active;
determining that the verification test covers the synchronization circuitry based on results of said checking;
verifying the circuit design by using at least the verification test; and providing the circuit design to a next step in a circuit design and manufacturing process which, when completed, produces an integrated circuit chip that contains correct synchronization circuitry.

16. The non-transitory computer-readable storage medium of claim 15, wherein the verification test covers the synchronization circuitry if the design mutation was activated and the CDC signal toggled while the design mutation was active, and wherein the verification test does not cover the synchronization circuitry if the design mutation was not activated or the CDC signal did not toggle while the design mutation was active.

17. The non-transitory computer-readable storage medium of claim 15, wherein the design mutation models a silicon behavior of the synchronization circuitry, and wherein the method further comprises reporting an error if (1) the verification test fails when the design mutation is not active, or (2) the verification test passes when the design mutation is not active, but fails when the design mutation is active.

18. The non-transitory computer-readable storage medium of claim 15, wherein the design mutation models an incorrect behavior of the synchronization circuitry, and wherein the method further comprises reporting an error if (1) the verification test fails when the design mutation is not active, or (2) the verification test passes when the design mutation is not active, but also passes when the design mutation is active.

* * * * *